May 31, 1938.    G. F. TURECHEK ET AL    2,118,991
ELECTROHYDRAULIC FISHING TOOL
Filed Sept. 4, 1934
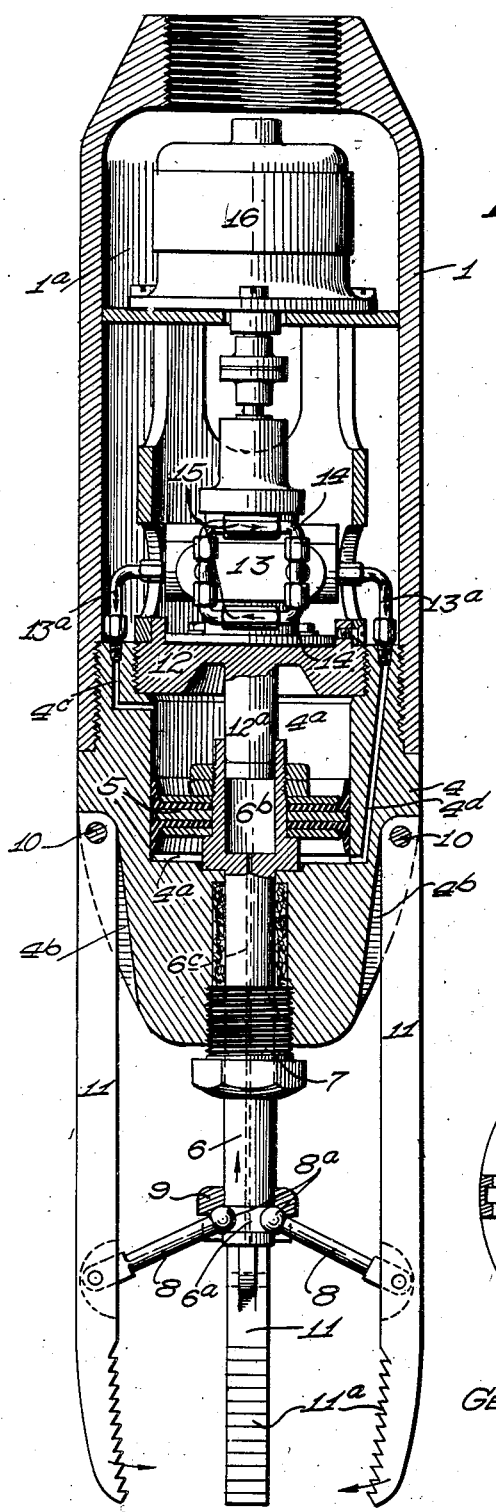
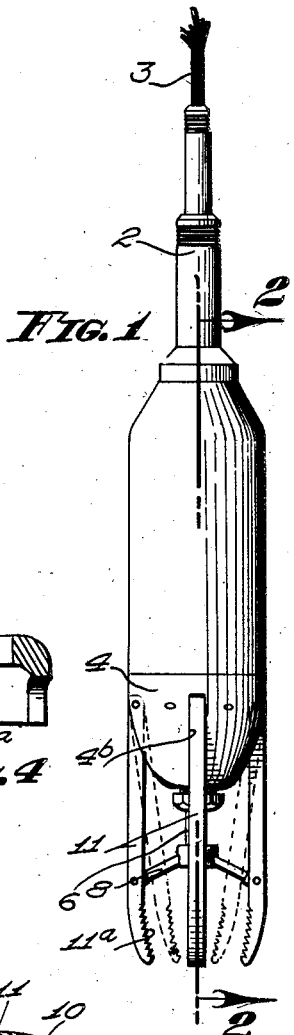
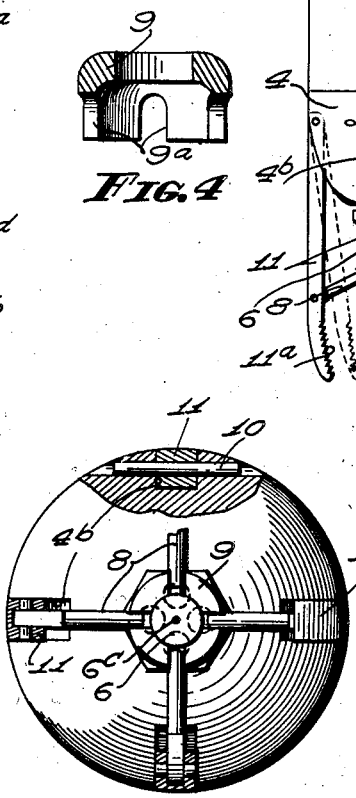
INVENTORS
GEORGE F. TURECHEK & ELMER R SMITH
BY Lloyd Spencer
ATTORNEY Patented May 31, 1938

2,118,991

UNITED STATES PATENT OFFICE 2,118,991

ELECTROHYDRAULIC FISHING TOOL

George F. Turechek and Elmer R. Smith, Los Angeles, Calif., assignors, by mesne assignments, to Lane-Wells Company, Los Angeles, Calif., a corporation of Delaware Application September 4, 1934, Serial No. 742,646

6 Claims. (Cl. 294—88)

Our invention relates to electro-hydraulic fishing tools and the objects of our invention are:

First, to provide a fishing tool which may be readily and quickly run in and withdrawn from a well bore, the tool being supported from a cable through which electrical energy is supplied to the tool;

Second, to provide a fishing tool which utilizes an electric driven pump means to actuate fishing or grabbing fingers, the pump means being so arranged that it may continue in operation although the grab fingers may be restrained by reason of contact with a "fish", whereby the grab fingers may be maintained under tension and the "fish" firmly held while the tool is raised to the mouth of the well;

Third, to provide a fishing tool wherein the grab or fishing fingers may be readily interchanged and fingers of various sizes and shapes used in order to grasp "fish" of different sizes and forms;

Fourth, to provide a fishing tool of this character wherein the fishing fingers may be shifted radially outwardly or inwardly with equal ease; and Fifth, to provide on the whole a novelly constructed electro-hydraulic fishing tool which is simple in design proportional to its functions; lends itself to sturdy and rugged construction, and which will not readily deteriorate or get out of order.

With these and other objects in view as may appear hereinafter, attention is directed to the accompanying drawing, in which:

Figure 1 is a side elevational view of our fishing tool shown in connection with a combined conducting and supporting cable; Figure 2 is an enlarged sectional view of the fishing tool with parts and portions in elevation and the connection with the cable omitted; Figure 3 is a bottom end view of the fishing tool with parts and portions in section; and Figure 4 is a sectional view of the connecting rod retainer.

A shell 1 embraces the upper portion of the fishing tool and is connected at its upper end to a suitable head 2 provided at the end of a combined conducting and supporting cable 3. The lower end of the shell is screwthreaded into the upper end of a body member 4 to form therewith a motor and pump receiving chamber 1a.

The body member 4 is provided with a relatively large cylinder 4a extending downwardly therefrom its upper or enclosed end. The cylinder 4a receives a piston 5 having a stem 6 which extends downwardly through the body member and a packing gland 7 provided therein.

The protruding end of the stem 6 is provided with an annular channel 6a of semi-circular section. Said channel receives spherical ends 8a of connecting rods 8. The connecting rods 8 extend radially outwardly and downwardly and their spherical ends 8a are held in the channel 6a by a retainer 9 which is generally in the form of an inverted cup apertured to slip on the stem 6 and having slots 9a in its side walls to clear the shanks of the connecting rods 8.

The body member is provided with a plurality of axially directed notches or recesses 4b each of which receives and journals by means of a pin 10 a grab finger 11. The several grab fingers extend downwardly beyond the body member and are pivotally connected intermediate their ends to the extremities of the connecting rods 8 so that axial movement of the piston stem 6 shifts the extremities of the grab fingers radially in and out. The extreme portions of the grab fingers 11 are provided with suitable teeth 11a.

The upper end of the piston cylinder 4a is closed by a plug 12 and passages 4c and 4d communicate with the cylinder 4a above and below respectively of the piston 5 and terminate at the upper side of the body member 4 within the shell 1.

A suitable pump unit 13 is mounted upon the plug 12. Said pump unit may be of any conventional design and, hence, is shown in elevation only. A gear type pump capable of creating high pressures but having only a nominal capacity and designed to run in either direction so that either end may constitute the inlet or outlet is most suitable. The inlet and outlet ports of the pump are connected by pipes 13a to the passages 4c and 4d. In addition two by-passes 14 are provided between the two sides of the pump, each by-pass being provided with a check valve 15 of conventional construction and arranged to open when the pressure difference between the sides of the pump exceeds a certain value.

The pump unit 13 is driven by an electric motor 16 mounted above the pump within the chamber 1a. The electric motor is electrically connected in any suitable manner with the conductor carried by the cable, not shown. The motor is preferably operable on direct current and so designed that it may be reversed by reversing the polarity of the direct current supply; whereby the single conductor cable and grounded circuit may be used.

In order to balance the pressure against the end of stem 6, said stem is enlarged at its inner end which extends through the piston 5 and provided with a socket 6b therein of the same diameter as the protruding end of the stem. The plug 12 is provided with a boss 12a which fits into the socket 6b and is equipped with suitable sealing means. The chamber formed by the boss 12a and socket 6b is intersected by a small passage or bore 6c leading to the exterior end of the stem 6. When the tool is to be used at moderate depths, or when the permissible diameter of the tool is large enough to provide ample area of the piston 5 above that of the stem 6, the above balancing means need not be incorporated. However, in wells of small bore and great depth, the hydrostatic pressure becomes so great that the balancing means may be utilized to a good advantage. It should be noted, however, that the hydrostatic pressure tends to close the grab fingers which is the movement requiring the greater force.

The fishing tool is operated as follows:

In lowering the tool, the fingers 11 are preferably in their collapsed or inner positions as shown by dotted lines in Figure 1. When the fish is reached, the motor is driven in the direction to cause the pump 13 to circulate a liquid from the lower to the upper side of the piston 5. The tool is then lowered until the fingers embrace the fish, and the motor reversed. When the fingers 11 encounter the fish and their further movement is prevented, one of the by-passes and its check valve enables the liquid to continue circulating through the pump while the pressure against the piston is maintained. This holds the fingers in engagement with the fish. Such a condition may be maintained while the tool is being withdrawn from the well bore.

We claim:

1. In a fishing tool: a housing structure; a plurality of grab fingers depending from the lower peripheral portion of said housing structure; a centrally disposed reciprocable stem protruding from said housing; links connecting said stem with the several grab fingers; a piston carried by the inner end of said stem; a cylinder for said piston formed within said housing; a pump unit and connections therefrom to said cylinder on either side of said piston for supplying fluid to either end of said cylinder and cause movement of said piston; an electric motor for driving said pump unit, said electric motor and pump mounted within said housing; by-passes and check valves therefor for permitting by-passing of fluid between the inlet and outlet of said pump unit when the pressure difference therebetween exceeds a predetermined value, whereby a predetermined pressure is maintained upon said piston upon arrest in the movement of said grab fingers.

2. In an electro-hydraulic well tool adapted to be lowered into a liquid filled well bore: a hydrostatically balanced piston and cylinder means including, a cylinder structure, a piston therein, a piston rod protruding from the cylinder structure, packing for sealing said piston rod, and a device to balance the hydrostatic pressure against the piston rod; a tool means operatively associated with said piston rod, said piston and cylinder defining pressure chambers on opposite sides of the piston; a pump means connected with the opposite sides of the piston to supply fluid under pressure to either chamber; and an electric motor for driving said pump means in either direction to reciprocate said piston in said cylinder.

3. In an electro-hydraulic well tool adapted to be lowered into a liquid filled well bore; a tool mechanism; a piston rod arranged to actuate said tool mechanism; a cylinder block arranged to receive said piston rod and forming a sealed connection therewith; a piston in said cylinder block and secured to the piston rod, said piston and cylinder block defining pressure chambers on opposite sides of the piston; a pump means connected with the opposite sides of the piston to supply fluid under pressure to either chamber; and an electric motor for driving said pump means in either direction to reciprocate said piston in said cylinder.

4. In an electro-hydraulic well tool adapted to be lowered into a liquid filled well bore; a hydrostatically balanced piston and cylinder means including, a cylinder structure, a piston therein, a piston rod protruding from the cylinder structure, packing for sealing said piston rod, and a device to balance the hydrostatic pressure against the piston rod; a tool means operatively associated with said piston rod, said piston and cylinder defining pressure chambers on opposite sides of the piston; a pump means connected with the opposite sides of the piston to supply fluid under pressure to either chamber; an electric motor for driving said pump means in either direction to reciprocate said piston in said cylinder, and a device associated with the pump means for maintaining a predetermined pressure difference between the chambers on opposite sides of said piston means upon the arrest in movement of said piston rod whereby a continued force may be exerted thereupon.

5. In an electro-hydraulic well tool adapted to be lowered into a liquid filled well bore; a tool mechanism; a piston rod arranged to actuate said tool mechanism; a cylinder block arranged to receive said piston rod and forming a sealed connection therewith; a piston in said cylinder block and secured to the piston rod, said piston and cylinder block defining pressure chambers on opposite sides of the piston; a pump means connected with the opposite sides of the piston to supply fluid under pressure to either chamber; an electric motor for driving said pump means in either direction to reciprocate said piston in said cylinder, and a device associated with the pump means for maintaining a predetermined pressure difference between the chambers on opposite sides of said piston means upon the arrest in movement of said piston rod whereby a continued force may be exerted thereupon.

6. In a well tool adapted to be lowered into a liquid-filled well bore: a tool mechanism; a piston rod arranged to actuate said tool mechanism; a cylinder block arranged to receive said piston rod and forming a sealed connection therewith; a power piston in said cylinder block and secured to said piston rod, said piston and cylinder block defining pressure chambers on opposite sides of the piston, one of said chambers being traversed by said piston rod; a balanced plunger means incorporated in said power piston and cylinder block, and associated with the chamber unoccupied by the piston rod; a port exposing said means to well fluid pressures, said means being substantially equal in area to said piston rod, thereby balancing the said power piston hydraulically; and an arrangement for supplying pressure fluid to either chamber.

GEORGE F. TURECHEK.
ELMER R. SMITH.